US008583275B2

(12) United States Patent
Dauvergne et al.

(10) Patent No.: US 8,583,275 B2
(45) Date of Patent: Nov. 12, 2013

(54) UNSTACKER DEVICE FOR A MACHINE FOR SORTING FLAT ARTICLES, AND A METHOD OF UNSTACKING FLAT ARTICLES

(75) Inventors: Mickael Dauvergne, Mercurol (FR); Stephane Ambroise, Serves (FR); Christophe Cordola, Saint Jean de Muzols (FR); Guy Forella, Saint Peray (FR)

(73) Assignee: Solystic, Gentilly Cedex (FR)

( * ) Notice: Subject to any disclaimer, the term of this patent is extended or adjusted under 35 U.S.C. 154(b) by 0 days.

(21) Appl. No.: 13/521,438

(22) PCT Filed: Mar. 19, 2012

(86) PCT No.: PCT/FR2012/050575
§ 371 (c)(1),
(2), (4) Date: Jul. 10, 2012

(87) PCT Pub. No.: WO2013/007904
PCT Pub. Date: Jan. 17, 2013

(65) Prior Publication Data

US 2013/0030563 A1 Jan. 31, 2013

(30) Foreign Application Priority Data

Jul. 13, 2011 (FR) ..................................... 11 56392

(51) Int. Cl.
*G06F 7/00* (2006.01)
*G06F 7/66* (2006.01)

(52) U.S. Cl.
USPC ........... 700/214; 700/213; 700/128; 700/220; 700/222; 700/230

(58) Field of Classification Search
None
See application file for complete search history.

(56) References Cited

U.S. PATENT DOCUMENTS

2011/0006470 A1* 1/2011 Conaway et al. ............... 271/34
2011/0048894 A1* 3/2011 Doane ........................ 198/460.1

FOREIGN PATENT DOCUMENTS

DE 102004012378 B3 9/2005
EP 2165775 A2 3/2010

OTHER PUBLICATIONS

International Search Report in PCT/FR2012/050575 dated Jun. 4, 2012, 2 pages.

* cited by examiner

*Primary Examiner* — Yolanda Jones
(74) *Attorney, Agent, or Firm* — Rothwell, Figg, Ernst & Manbeck, P.C.

(57) ABSTRACT

The invention relates to an unstacker device for unstacking flat articles, said unstacker device including: first detection means for detecting transitions between article types; at least first and second specialized unstacking programs and a default unstacking program, which programs are suitable for maintaining respectively a first nominal gap, a second nominal gap, and a default nominal gap, between two consecutive flat articles; and a monitoring/control unit arranged for automatically executing said default unstacking program in response to detection of said transition, for counting said flat articles subsequent to said transition, and, in response to a predetermined counting threshold being reached, for executing, for said subsequent flat articles and until the next transition detection, the corresponding one of said first and second specialized unstacking programs. The invention also relates to a method of unstacking flat articles using said unstacker device.

10 Claims, 4 Drawing Sheets

UNSTACKER DEVICE FOR A MACHINE FOR SORTING FLAT ARTICLES, AND A METHOD OF UNSTACKING FLAT ARTICLES

CROSS REFERENCE TO RELATED APPLICATION(S)

This application is a 35 U.S.C. §371 National Phase Entry Application from PCT/FR2012/050575, filed Mar. 19, 2012, designating the United States and also claims the benefit of French Application No. 1156392, filed Jul. 13, 2011, the disclosures of which are incorporated herein by reference in their entirety.

TECHNICAL FIELD

The invention relates generally to an unstacker device for a sorting machine for sorting flat articles, said unstacker device being configured to accept at its inlet flat articles in a stack, and to deliver at its outlet said flat articles in series, and with a predetermined gap between them, said unstacker device including at least: first detection means suitable for detecting the transition between an article N of a first specialized article type or of a default article type and a consecutive article N+1, respectively of a second or of a first specialized article type; a first specialized unstacking program and a second specialized unstacking program, each of which is suitable for maintaining respectively a first nominal gap and a second nominal gap between two consecutive flat articles; and a monitoring/control unit suitable for automatically executing one of said first and second specialized unstacking programs depending on the article type that is detected.

The invention also relates to a method of unstacking flat articles, during which method flat articles disposed as a stack are accepted as input, and an "unstacking" step is performed for unstacking the flat articles so that said flat articles are delivered as output in series and separated by a predetermined gap, a "transition detection" step is performed during which the transition between an article N of a first specialized article type or of a default article type and a consecutive article N+1 respectively of a second or of a first specialized article type is detected, and said predetermined gap is modified respectively depending on the article type that is detected so as to apply a corresponding first nominal gap or a corresponding second nominal gap.

PRIOR ART

Currently, sorting machines for sorting flat articles are in common use for managing flows of flat articles of various types, such as, for example, letters, postcards, open magazines, and mail wrapped in plastic material. The spectrum of types of articles to be unstacked and to be conveyed is often broad. Such sorting means incorporate guide means and various movement means for guiding and moving the flat articles, such as, in particular, belt conveyors, e.g. perforated-belt conveyors coupled to suction chambers, nipped-belt conveyors. The physical, dimensional, and materials characteristics of such flat articles are often very different from one article type to another. And yet those characteristics have significant impacts on the way the flat articles of each article type can be moved. Thus, the behavior of the flat articles in the conveyor means is very different from one article type to another, certain flat articles tending to be slowed down to a greater extent than others. This difference may be accentuated as a function of the type of conveyors used. This applies particularly for nipped-belt conveyors that are of long lengths and that form bends. With certain flat articles slowing down, the gap between flat articles of different types tends to vary as the flat articles move, and there is then a risk of jamming and/or of consecutive flat articles catching each other up. It is thus important for such sorting machine to incorporate unstacker devices that are suitable for optimally managing the gaps between flat articles.

Publication EP 2 165 775 describes an unstacker device for a sorting machine for sorting flat articles, the inlet of that unstacker device receiving uniform batches of flat articles to be sorted and to be distributed to a plurality of outlets, e.g. as a function of the successive delivery points. Each homogenous batch of flat articles comprises flat articles having in common a dimensional and/or physical and/or materials parameter. The sorting is obtained in one pass or more often in a plurality of passes. That unstacker device has sensors suitable for detecting and recognizing the article type of the batch that arrives at the inlet of the unstacker device so as to act automatically and as a function of the recognized article type to adapt one of the operating parameters of the unstacker device, such as the speed of movement of said flat article, the gap between two flat articles, the acceleration ramp rate, the level of vacuum in the suction chamber, or the triggering time of an anti-bunching device. Those detection means are, in particular, adapted to recognize plastic wrappers, and magazines bound by means of metal staples. In that publication, a homogenous batch may comprise a single flat article. Thus, in order to avoid any problem of jamming or of catching up of flat articles, the settings for the operating parameter of that unstacker device can vary from one flat article to another. However, that type of unstacker device has a limited unstacking rate. This is because certain operating parameters for that type of unstacker device, such as, for example, the inclination of the stack of flat articles arriving at the inlet and on edge, and the suction of the suction chamber, cannot be modified instantaneously and require a certain lapse of time before their new values are reached and are stable, thereby making it impossible for them to be modified for each successive mailpiece. Thus, modifying settings every time a different article type is detected is detrimental to the unstacking rate and to the reliability of the unstacker device. It is not infrequent for the detected flat articles to be moved by one meter before the correct value, e.g. a suction value, is reached. Indeed, in that publication, it is specified that the unstacker device is intended for a homogenous batch of articles. In addition, that type of unstacker device makes it possible to adapt the gap between flat articles as a function of predetermined article types. However, it does not make it possible to adapt the way in which each flat article is handled by the unstacker device as a function of additional physical specificities inherent to each flat article. In addition, it does not make it possible to manage non-uniform batches of flat articles.

SUMMARY OF THE INVENTION

An object of the invention is to remedy those drawbacks by proposing a method and a device for unstacking flat articles making it possible to take account of the various article types, while anticipating the risks of variation in the gap between flat articles, and while also optimizing the unstacking rate. Another object of the invention is to propose a method and a device making it possible, in addition to taking account of various article types, to adapt the handling of each article as a function of the specificities of said article within the article type to which it belongs, in particular so as to preserve better the structural integrity of each flat article.

To this end, the invention provides an unstacker device for a sorting machine for sorting flat articles, said unstacker device being configured to accept at its inlet flat articles in a stack, and to deliver at its outlet said flat articles in series, and with a predetermined gap between them, said unstacker device including at least:

first detection means suitable for detecting the transition between an article N of a first specialized article type or of a default article type and a consecutive article N+1, respectively of a second specialized article type or of a first specialized article type;

a first specialized unstacking program and a second specialized unstacking program, each of which is suitable for maintaining respectively a first nominal gap and a second nominal gap between two consecutive unstacked flat articles; and a monitoring/control unit suitable for automatically executing one of said first and second specialized unstacking programs depending on the article type that is detected;

said unstacker device being characterized in that it includes a default unstacking program suitable for maintaining a default nominal gap between two consecutive unstacked articles, which default nominal gap is different from said first and second nominal gaps, said monitoring/control unit being arranged for automatically executing said default unstacking program in response to detection of said transition, for counting said flat articles subsequent to said transition, and, in response to a predetermined counting threshold being reached, for executing, for said subsequent flat articles and until the next transition detection, that one of said first and second specialized unstacking programs that corresponds to the detected specialized article type.

The term "gap" is used herein to mean the space without any flat article that extends between the downstream portion of a first flat article and the upstream portion of a second flat article in the direction of movement of the flat articles.

The unstacker device of the invention makes it possible to detect effectively the transitions between unstacked article types. Since the settings are changed only after the need for such changes in settings has been confirmed by a predetermined threshold being reached, the unstacker device of the invention makes it possible to adapt the gaps between the flat articles optimally by averaging out the risks of error.

The device of the invention may advantageously have the following features:

said default nominal gap is larger than said second nominal gap, which is itself larger than said first nominal gap;

the unstacker device includes at least one third specialized unstacking program suitable for maintaining a third nominal gap between two consecutive flat articles, and a fourth specialized unstacking program suitable for maintaining a fourth nominal gap between two flat articles;

said third nominal gap is larger than said second nominal gap and is smaller than said default nominal gap, and said fourth nominal gap is larger than said third nominal gap and smaller than said default nominal gap;

said first detection means are arranged to detect at least one of said first, second, third, and fourth specialized article types on the basis of at least one predetermined article type and corresponding respectively to letter-format flat articles, to large-format flat articles, to magazines, and to wrapped flat mailpieces;

the unstacker device further includes second detection means arranged to detect the difference between at least one predetermined physical characteristic of said unstacked flat article and the predetermined nominal value of said physical characteristic for the specialized article type to which said flat article corresponds, said monitoring/control unit being suitable for modulating said corresponding nominal gap in predetermined manner as a function of this difference detection;

said control unit is suitable for modifying said predetermined gap or for modulating one of said nominal gaps by applying a predetermined value to at least one of the operating parameters of said unstacker device chosen from the group comprising at least the speed of movement of said flat article, the inclination of said flat article on edge, the position and the pressure of blowing applied to said flat article, the magnitude of suction applied to said article; and said predetermined physical characteristic is chosen from the group comprising at least the dimensions, the stiffness, the thickness, and the weight of said unstacked flat article.

The invention also provides a method of unstacking flat articles, during which method flat articles disposed as a stack are accepted as input, and an "unstacking" step is performed for unstacking the flat articles and said flat articles are delivered as output in series and separated by a predetermined gap, a "transition detection" step is performed during which the transition between an article N of a first specialized article type or of a default article type and a consecutive article N+1 respectively of a second or of a first specialized article type is detected, and said predetermined gap is modified respectively depending on the article type that is detected so as to apply a corresponding first nominal gap or a corresponding second nominal gap, said method being characterized in that, after a transition has been detected, said flat articles are unstacked with a default nominal gap that is different from said first and second nominal gaps, in that, during an "increment counter" step, said flat articles subsequent to said transition are counted, in that, during a "counting threshold reached" step a check is made to determine whether said counting has reached a predetermined counting threshold, and, when said counting threshold is reached, and until the next transition detection in the "transition detection" step, said subsequent flat articles are unstacked with said first or second nominal gap corresponding to the detected article type.

Advantageously, during a "difference detection" step, a check is made to detect the difference between at least one predetermined physical characteristic of said unstacked flat article and the predetermined nominal value of said physical characteristic for said corresponding specialized article type, and in that, during a "modulate program" step, said corresponding nominal gap is modulated in predetermined manner as a function of said difference detection respectively in said specialized or in said default unstacking program.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF THE EMBODIMENTS

Figure 1:
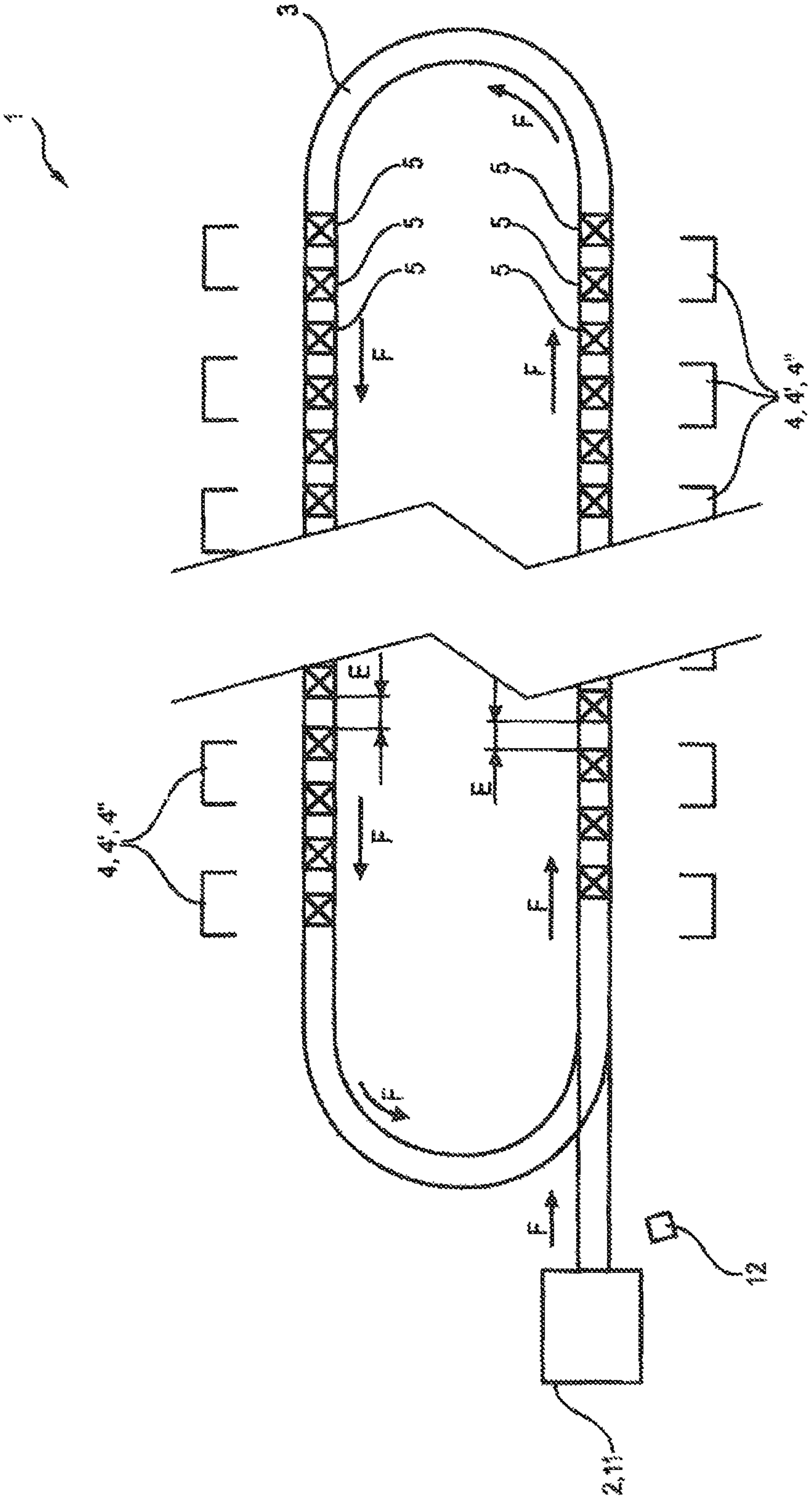
FIG. 1 is a plan view of a machine for sorting flat articles that includes an unstacker device of the invention.

With reference to FIG. 1, the sorting machine 1 for sorting flat articles 5 comprises an unstacker device 2, conveyor means 3 and sorting outlets 4, 4', 4". At its inlet, the unstacker device 2 receives flat articles 5 disposed in a stack and on edge. The flat articles 5 are unstacked in a manner known to the person skilled in the art, and, at the outlet of the unstacker device 2, they are spaced apart with a predetermined gap so as to be moved in series and on edge. In the example shown, the conveyor means 3 comprise, in particular, a belt conveyor of the "closed" type, forming a loop along which the sorting outlets 4 are distributed. Thus, once they are unstacked, the flat articles 5 are conveyed towards the sorting outlets 4 in a predetermined sorting logic. The direction of movement of the flat articles 5 on the belt conveyor is shown diagrammatically by the arrows F. Naturally, the invention also applies to any flat-article sorting machine having a conveyor of the "open" type that does not form a closed loop.

Figure 2:
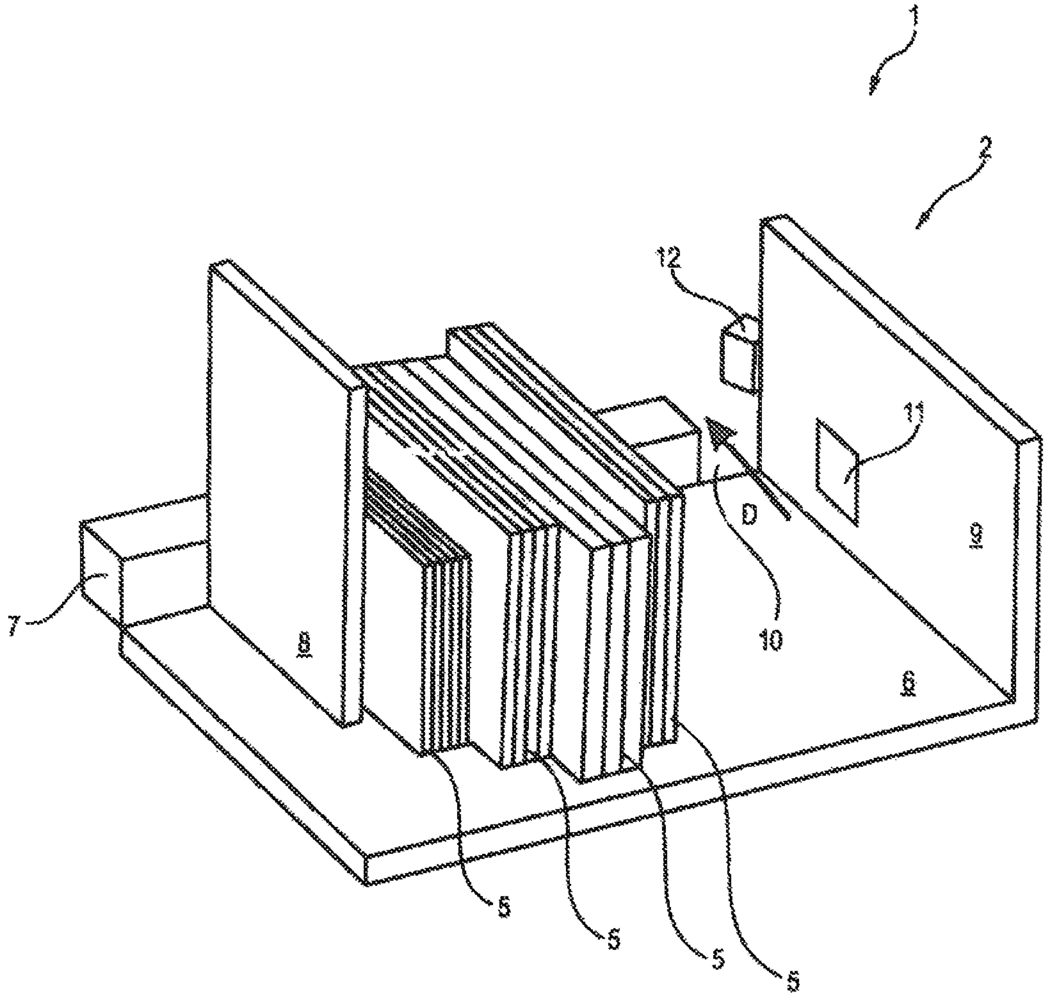
FIG. 2 is a fragmentary perspective view of the unstacker device of the invention.

With reference to FIG. 2 which shows in detail the unstacker device 2, the flat articles 5 stand on edge on a motor-driven bottom belt 6. They are aligned along a jogger edge 7, and they are pressed against a stationary plate 9, via a moving paddle 8 that is mounted to move in translation towards the plate 9. The plate 9 and the jogger edge 7 are separated by an extraction slot 10 through which the flat articles 5 are unstacked, in known manner, in the direction D indicated by an arrow. The unstacker device 2 also includes first detection means 11, e.g. incorporated in the stationary plate 9 and designed to detect transitions between various predetermined types of article, e.g.:

a first specialized article type corresponding to small-format paper mailpieces, e.g. letter-format;

a second specialized article type corresponding to large-format paper mailpieces;

a third specialized article type corresponding to magazines with staples; and a fourth specialized article type corresponding to flat articles wrapped in plastic.

In the example shown, prior to unstacking, the first detection means 11 deliver information relating to any transition from one specialized article type to another. The unstacking can thus be performed while taking account of this transition. In another embodiment (not shown), the first detection means 11 deliver said information during unstacking, early enough to enable the information to be passed on so that it influences the gap with which the flat articles are unstacked.

In one embodiment (not shown), during a second sorting pass or a subsequent pass, the transitions may be known from the preceding sorting pass during which a list may be established, said list including, for example, the articles and their corresponding article types. The detection means then incorporate this pre-established list.

In another embodiment (not shown), the transitions may be known in advance, e.g. through a list associated with each stack of flat articles, which list is given by the issuer of the batch containing the stack of flat articles. Like the preceding list, this list may contain the articles and their corresponding article types. In this embodiment, the detection means also incorporate this pre-established list.

With reference to the figures, the specialized article type may be detected sequentially and relatively in the sense that the transition between a previously detected specialized article type and the currently detected specialized article type is detected. The detection step may thus comprise detection sub-steps as described below. For example, during a first detection sub-step, a check is made to determine whether the flat article 5 to be unstacked belongs to the fourth specialized article type (flat mailpieces wrapped in plastic) by detecting the material of its outside faces. If said material is plastic rather than paper, the flat article 5 is assigned to the fourth specialized article type (flat mailpieces wrapped in plastic) and is unstacked with a fourth nominal gap between consecutive flat articles 5. If said material is not detected as being plastic, then, during a second detection sub-step, a check is made to determine whether the flat article to be unstacked includes one or more staples. In the event that one or more staples are present, the flat article 5 to be unstacked is assigned to the third specialized article type (magazines with staples) and is unstacked with a third nominal gap between consecutive flat articles 5. In the event that no staples are detected, then, during a third detection sub-step, a check is made to determine whether the dimensions of the flat article 5 to be unstacked correspond to articles of the second specialized article type (large-format paper mailpieces). If they do correspond, the flat article 5 to be unstacked is assigned to the second specialized article type (large-format paper mailpieces) and is unstacked with a second nominal gap between consecutive flat articles 5. If they do not correspond, the flat article 5 being unstacked is assigned to the first specialized article type (small-format paper mailpieces) and is unstacked with a first nominal gap between consecutive flat articles 5. Naturally, the specialized article types may be predetermined on the basis of criteria other than those described, and the detection sequence may be different. Similarly, the number of specialized article types may be larger or smaller. The first detection means 11 thus make it possible to detect any transition between the type of an unstacked flat article N and the type of a consecutive flat article N+1 to be unstacked. As described above, this transition detection is used to adapt operation of the unstacker device 2, and in particular to adapt the predetermined gap between consecutive flat articles 5 as a function of their physical characteristics, and of the risks of slippages and offsets that are inherent to said physical characteristics. For example, the first detection means 11 may comprise a material sensor, a camera, or any other suitable known means. The first detection means 11 may also be disposed facing the extraction slot 10 above the stack of flat articles 5.

The unstacker device 2 also includes a monitoring/control unit (not shown) that automatically executes various unstacking programs respectively adapted to the various specialized article types detected by the first detection means 11. Thus, a first specialized unstacking program is suitable for maintaining a first predetermined nominal gap between two consecutive flat articles 5 of a first specialized article type (small-format paper mailpieces), e.g. a gap of 100 millimeters (mm); a second specialized unstacking program is suitable for maintaining a second predetermined nominal gap between two consecutive flat articles 5 of a second specialized article type (large-format paper mailpieces), e.g. a gap of 150 mm; a third specialized unstacking program is suitable for maintaining a third predetermined nominal gap between two consecutive flat articles 5 of a third specialized article type (magazines with staples), e.g. a gap of 200 mm; and a fourth specialized unstacking program is suitable for maintaining a fourth predetermined nominal gap between two consecutive flat articles 5 of a fourth specialized article type (magazines), e.g. a gap of 250 mm. In addition, a default unstacking program is suitable for maintaining a default predetermined nominal gap between two consecutive flat articles 5 of no specialized article type, e.g. a gap of 300 mm. As described below, said default unstacking program is used as a "fallback" program when the unstacked flat articles 5 have non-uniform characteristics, and also at each transition. Thus, whenever a transition is detected, the monitoring/control unit executes the default unstacking program and counts the flat articles 5 subsequent to detection of the transition. If another transition is detected, the counter is reset, and the counting starts again. When, after a transition, a predetermined counting threshold is reached, the monitoring/control unit executes the corresponding first, second, third, or fourth specialized unstacking program. So long as the counting threshold is not reached, the monitoring/control executes the default unstacking program and unstacks the flat articles 5 with the nominal gap between them. Thus, once the counting threshold is reached, the predetermined gap between two unstacked flat articles 5 is adapted to the specialized type to which the unstacked articles and the next article to be unstacked correspond. Each specialized unstacking program and the default program corresponds to operating parameters having specific predetermined values. For example, these operating parameters may be the speed of movement of the flat article 5, the angle of the flat article 5 on edge, the position and the pressure of blowing applied to the flat article 5, or the magnitude of suction applied to the flat article 5. For example, the angle of the flat article 5 on edge may be adjusted by causing advance and retard of the bottom belt 6 and of the paddle 8 to vary separately.

Each specialized or default type of article may correspond to various physical characteristics of the flat articles 5, e.g. dimensional, stiffness, thickness, and weight characteristics. Thus, within the same specialized article type, said physical characteristics may vary. The monitoring/control unit is arranged to store in a memory a nominal value for each of these physical characteristics, said nominal value being predetermined as a function of the article type to which the flat articles 5 belong. Each nominal value may also be a range of values. The unstacker device 2 is provided with second detection means 12 that are suitable for detecting, for any given specialized article type, whether one of the predetermined physical characteristics of the unstacked flat article 5 is different from the predetermined nominal value. In the event that it is different, the monitoring/control unit modulates, in predetermined manner, the operating parameters of the unstacking program used, and thus the nominal gap between two consecutive unstacked flat articles 5.

The unstacker device 2 as described above may advantageously be coupled to one or more other similar or different unstacker devices 2.

Figure 3:
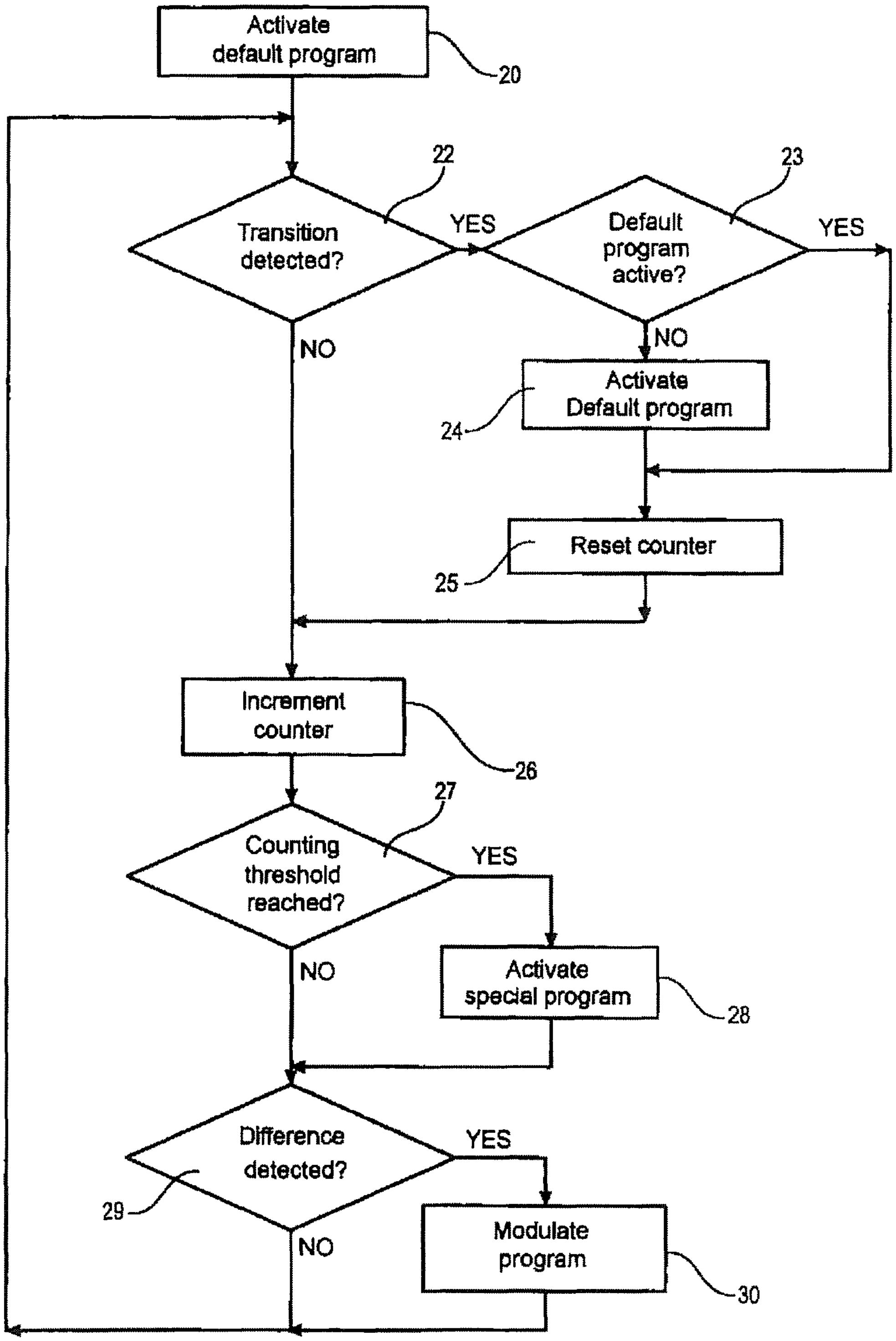
FIG. 3 is a flow chart diagrammatically showing the steps of the unstacking method of the invention.

The unstacking method of the invention is described below with reference to FIG. 3. At the start, in the "activate default program" step 20, the monitoring/control unit executes the default unstacking program with the corresponding operating parameter settings, so as to form a predetermined default nominal gap between two consecutive unstacked flat articles 5. This default nominal gap, e.g. a gap of 300 mm, is adapted to suit all of the article types. The default program is thus a "fallback" unstacking program making it possible to unstack the flat articles 5 with a default nominal gap avoiding jamming and bunching problems, regardless of the type of flat article 5 unstacked. This default unstacking program is adapted to suit worst-case scenarios. However, it does not make it possible to achieve optimum efficiency for the unstacker device 2, hence the advantage of having specialized unstacking programs operating with smaller nominal gaps and enabling the unstacker device 2 to attain higher efficiency.

During a "transition detection" step 22, the first detection means 11 are used in order to check whether the unstacked flat article 5 belongs to one of the specialized article types.

If, in this "transition detection" step 22, the flat article 5 to be unstacked is detected as being of a specialized article type different from the article type corresponding to the active unstacking program, then the method continues with the "default program active?" step 23, during which a check is made to determine whether the active unstacking program is the default unstacking program.

If the unstacking program being used is different from the default unstacking program, an "activate default unstacking program" step 24 is performed, during which the default unstacking program is activated. The "activate default program" step 24 is followed by a "reset counter" step 25, during which the counter is reset.

If the unstacking program being used during the "default program active?" step 23 is the default unstacking program, the method continues directly with the "reset counter" step 25.

Then an "increment counter" step 26 is performed during which, at each flat article 5 to be unstacked, subsequent to detecting the transition and that corresponds to the detected specialized article type, the counter is incremented by one unit.

Then, during the "counting threshold reached" step 27, a check is made to determine whether the counted number of flat articles 5 of the specialized article type detected after the transition is equal to the predetermined counting threshold, e.g. a threshold of three flat articles 5 counted.

If the predetermined counting threshold is reached, the unstacking method continues with the "activate special program" step 28, during which the monitoring/control unit goes from the default unstacking program to one of the specialized unstacking programs. Thus, the monitoring/control unit modifies the gap between unstacked consecutive flat articles 5 and optionally modifies one or more of the other operating parameters of the unstacker device 2 as described below.

Then, a "difference detection" step 29 is performed, during which the second detection means 12 are used to check whether the predetermined physical characteristics of the unstacked flat article 5 correspond to the nominal values set by the special unstacking program. For example, these physical characteristics may be the dimensions, the stiffness, the thickness, and/or the weight of the unstacked flat article. The difference detection may concern one or more of these physical characteristics.

If, at this "difference detection" step 29, the physical characteristics of the unstacked flat article 5 correspond individually to the set nominal values, no difference is detected, and the unstacking method continues with the above-described "transition detection" step 22.

If, at the "difference detection" step 29, one (or more) of the physical characteristics of the unstacked flat article 5 does not/do not correspond to its/their nominal value(s) pre-established in the active unstacking program, a difference is detected, and the unstacking method continues with the "modulate program" step 30, during which one or more operating parameters of the unstacker device 2 is/are modulated in predetermined manner as a function of the detected difference in physical characteristic. It is thus possible, for example, to modulate one or more of the following parameters: the speed of movement of the flat article 5, the angle of the flat article 5 on edge, the position and the pressure of blowing applied to the flat article 5, and the magnitude of suction applied to the flat article 5.

After the "modulate program" step 30, the unstacking is continued in the unstacking program in progress with the operating parameters modulated, and the "transition detection" step 22 is performed as described above.

If, during the "counting threshold reached" step 27, the predetermined threshold is not reached, the unstacking method continues with the "difference detection" step 29 as described above.

The "counting threshold reached" step 27 thus makes it possible to average out the risks of errors and to preserve the time necessary for the operating parameters to change between two different settings. Known unstacker devices react article by article, and so they are often unstable because they can change unstacking program at each flat article to be unstacked. They are also not very effective because frequently the new operating parameter has not had time to be reached before it needs to be modified again to adapt to the new flat article to be unstacked. In addition, known unstacker devices take detection errors into account. Thus, in the event that the need to change unstacking program is detected erroneously, the unstacking program is changed without it being possible to avoid that change. Thus, the unstacker device 2 and the unstacking method of the invention make it possible to take such detection errors into account and to have stable operation during which the settings have time to be reached before any other change is made. In the event of an isolated erroneous detection, the threshold will then either:

not be reached, detection of the subsequent flat articles 5 making it possible to correct the detection error if the subsequent detections of the characteristics of the flat articles 5 do not confirm the prior erroneous detection; or be reached if the flat articles 5 subsequent to the erroneous detection are of the same article type as the flat article 5 that caused the erroneous detection.

In the latter case, the change of unstacking program will be justified by the fact that the type of the subsequent flat articles 5 is the same as the type of the flat article 5 that caused the erroneous detection. The threshold thus makes it possible to have a time delay between detection and application of the setting related to said detection. During this lapse of time, the default unstacking program makes it possible to continue to unstack the flat articles 5. The unstacker device 2 and the method of the invention thus make it possible to use non-uniform batches of flat articles 5 while also having optimum efficiency in terms of unstacking rate.

If, in the "transition detection" step 22, the flat article 5 to be unstacked is of the same article type as the type corresponding to the unstacking program that is active and that is being used, then the method continues with the above-described "increment counter" step 26. The above-described steps are controlled individually by the monitoring/control unit.

Figure 4:
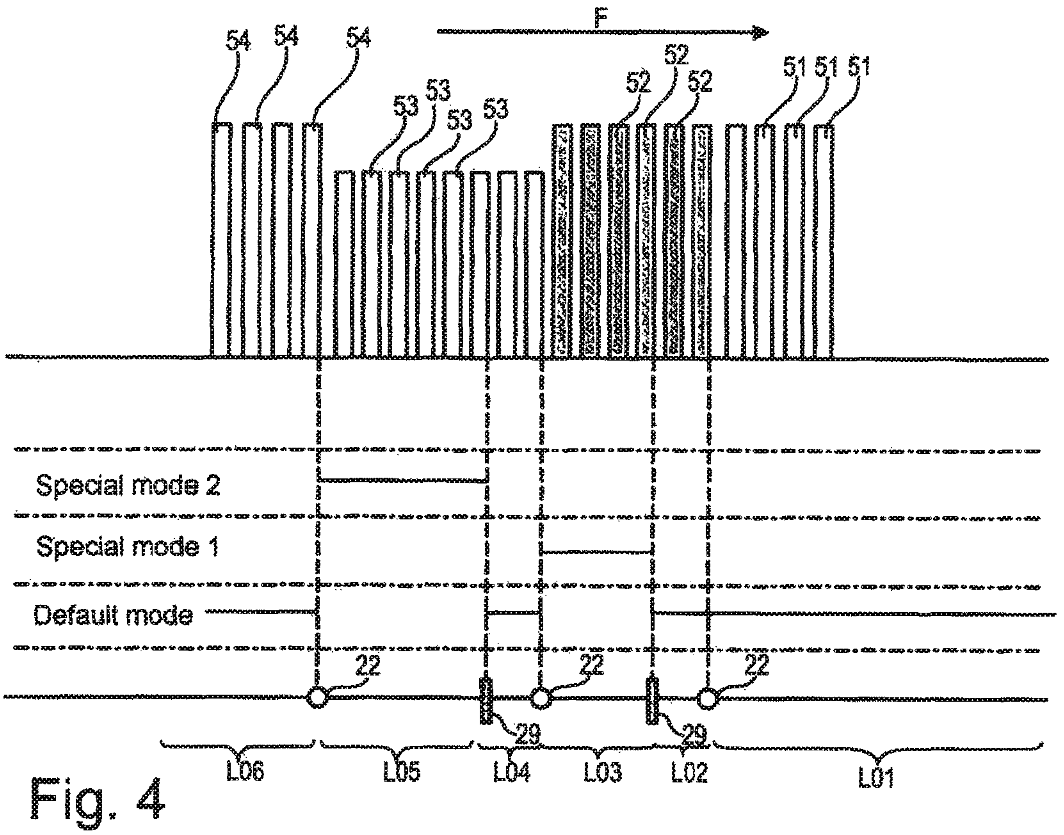
FIGS. 4 and 5 are diagrams showing two operating sequences of the unstacking method.
Figure 5:
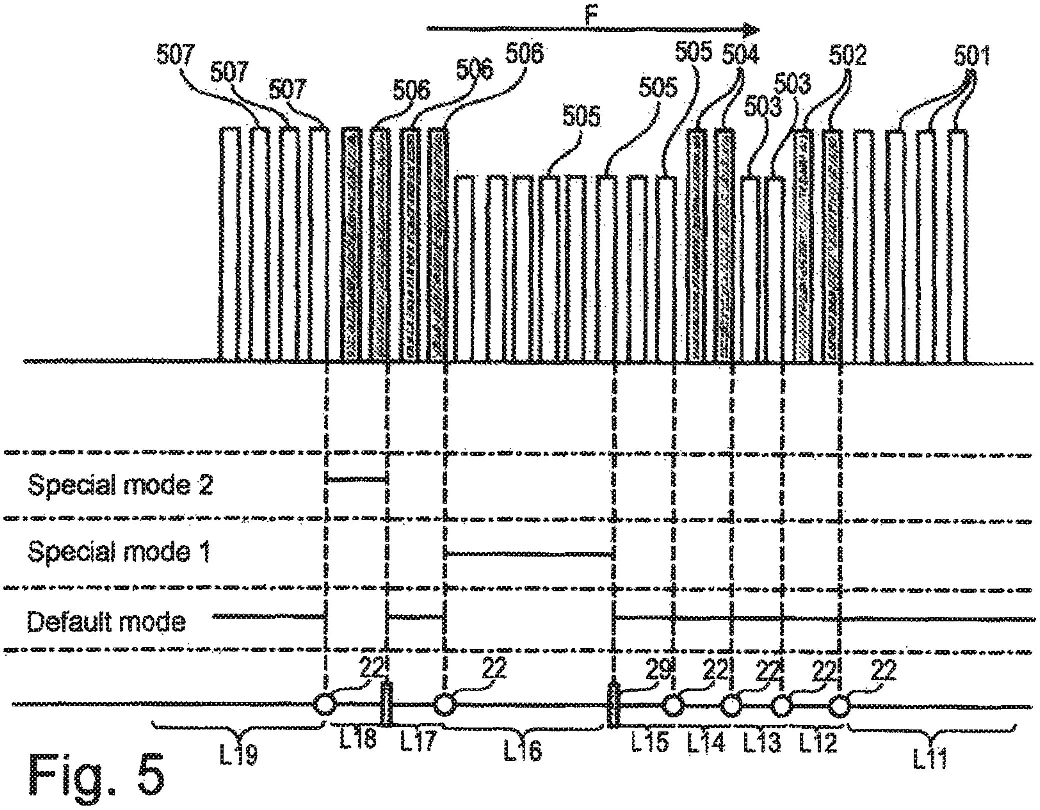

FIGS. 4 and 5 show, in simplified manner, two operating sequences of the unstacking method of the invention. In each of these figures, the upper portion shows the state of the stack of flat articles arriving at the inlet of the unstacker device, and the bottom portion graphically shows the "transition detection" step 22 and the "counting threshold reached" step 27, and going between the various default and specialized unstacking programs. The direction of advance of the flat articles is indicated by the arrow F. In addition, with concern for clarity, the "difference detection" step 29 is not shown in these figures.

With reference to FIG. 4, in the first operating sequence, the flat articles of the first bundle of articles 51 unstacked are of a non-predetermined article type. For a first period of time L01, the monitoring/control unit thus executes the default unstacking program through the "activate default program" steps 20 and 24. Thus, during this first period of time L01, the flat articles are unstacked with a default nominal gap between them. The period of time L01 runs until a transition is detected. When, in the "transition detection" step 22, the first flat article of a second bundle of articles 52 belonging to a first specialized article type is detected, the monitoring/control unit continues to execute the default unstacking program by unstacking the flat articles with a default nominal gap between them for a second period of time L02. The second period of time L02 runs until the counting threshold is reached or until another transition is detected. In the example shown, when the threshold of flat articles of the first specialized article type is reached in the "counting threshold reached" step 27, then, through the "activate special program" step 28, the monitoring/control unit executes the first specialized unstacking program. Thus, for a third period of time L03, the monitoring/control unit unstacks the flat articles, with a first nominal gap between them, said first nominal gap being different from and preferably smaller than the default nominal gap. The third period of time L03 runs until any other transition is detected. Thus, in the example shown, when, during the "transition detection" step 22, the first article of a third bundle of articles 53 belonging to a second specialized article type is detected, the monitoring/control unit executes the default unstacking program for a fourth period of time L04 until the corresponding threshold is reached. Thus, during the fourth period of time L04, the monitoring/control unit unstacks the flat articles with the default nominal gap between them. Then, in the example shown, when the threshold of flat articles of the newly detected second specialized article type is reached, the monitoring/control unit executes the second specialized unstacking program. Thus, for a fifth period of time L05, the monitoring/control unit unstacks the flat articles with a second nominal gap between them, said second nominal gap being different from the default nominal gap and from the first nominal gap, and preferably being smaller than the default nominal gap. The fifth period of time L05 runs until any other transition is detected. Thus, when, during the "transition detection" step 22, the first article of a fourth bundle of articles 54 is detected, the monitoring/control unit executes the default unstacking program for a sixth period of time L06 until the corresponding threshold is reached. Thus, during the sixth period of time L06, the monitoring/control unit unstacks the flat articles with the default nominal gap between them. Since the articles of the fourth bundle of articles 54 do not belong to any of the predetermined specialized article types, operation with the default unstacking program is continued until any other transition is detected.

With reference to FIG. 5, in the second operating sequence, the flat articles of the first bunch of articles 501 are of a non-predetermined article type. For a first period of time L11, the monitoring/control unit thus executes the default unstacking program through the "default program" steps 20 and 24 by unstacking the flat articles with a default nominal gap between them. The period of time L11 runs until a transition is detected. Then, when, in the "transition detection" step 22, the first flat article of a second set of articles 502 belonging to a first specialized article type is detected, the monitoring/control unit continues to execute the default unstacking program. Thus, for a second period of time L12, the flat articles continue to be unstacked, with the default nominal gap between them. The second period of time L12 runs until a transition is detected. Then, when, during the "transition detection" step 22, the first flat article of a third bundle of articles 503 belonging to a second specialized article type is detected, the monitoring/control unit continues for a third period of time L13 to execute the default unstacking program by unstacking the flat articles with the default nominal gap between them. The third period of time L13 runs until the predetermined counting threshold is reached or until another transition is detected. In the example shown, when, in the "transition detection" step 22, the first flat article of a fourth bunch of articles 504 belonging to a third specialized article type is detected, the monitoring/control unit continues to execute the default unstacking program for a fourth period of time L14. The fourth period of time L14 runs until the predetermined counting threshold is reached or until another transition is detected. In the example shown, between the preceding "transition detection" steps 22, since the counting threshold for flat articles of the detected first specialized article type has not been reached, the monitoring/control unit continues to execute the default unstacking program. Then, when, in the "transition detection" step 22, the first article of a fifth bundle of articles 505 belonging to the second specialized article type is detected, the monitoring/control unit continues to execute the default stacking program for a fifth period of time L15. The fifth period of time L15 runs until the predetermined counting threshold is reached or until another transition is detected. In the example shown, when the counting threshold of flat articles of the newly detected second specialized article type is reached, the monitoring/control unit executes the second specialized unstacking program through the "modulate program" 25 step, in particular. Thus, during this sixth period of time L16, the flat articles are unstacked with a second nominal gap between them. The sixth period of time L16 runs until another transition is detected. In the example shown, when, in the "transition detection" step 22, the first flat article of a sixth set of articles 506 belonging to the first specialized article type is detected, the monitoring/control unit executes the default unstacking program. Thus, for a seventh period of time L17, the flat articles are unstacked with the default nominal gap between them. The seventh period of time L17 runs until the predetermined counting threshold is reached or until another transition is detected. Thus, when the counting threshold of flat articles of the newly detected first specialized article type is reached, the monitoring/control unit executes the first specialized unstacking program through the "modulate program" 25 step, in particular. During an eighth period of time L18, the flat articles are unstacked with a first nominal gap between them. The eighth period of time L18 runs until another transition is detected. Finally, when, through the "transition detection" step 22, the first article of a seventh bundle of articles 507 is detected, the monitoring/control unit continues to execute the default stacking program for a ninth period of time L19. The ninth period of time L19 runs until the predetermined counting threshold is reached or until another transition is detected. In the example shown, since the articles of the seventh bundle of articles 507 do not belong to any specialized article type, operation using the default unstacking program is continued by the monitoring/control unit, and the flat articles are unstacked, with the default nominal gap between them.

Naturally, these two operating sequences are given merely by way of example, and a multitude of other operating sequences are possible.

The invention claimed is:

1. An unstacker device for a sorting machine for sorting flat articles, said unstacker device having an inlet and an outlet and being configured to accept at its inlet flat articles in a stack, and to deliver at its outlet said flat articles in series, and with a predetermined gap between said flat articles, said unstacker device comprising:

first detection means suitable for detecting the transition between an article N of a first specialized article type or of a default article type and a consecutive article N+1, respectively of a second specialized article type or of a first specialized article type;

a first specialized unstacking program and a second specialized unstacking program, each of which is suitable for maintaining respectively a first nominal gap and a second nominal gap between two consecutive unstacked flat articles; and a monitoring/control unit suitable for automatically executing one of said first and second specialized unstacking programs depending on the article type that is detected;

wherein said unstacker device includes a default unstacking program suitable for maintaining a default nominal gap between two consecutive unstacked articles, which default nominal gap is different from said first and second nominal gaps, said monitoring/control unit being arranged for automatically executing said default unstacking program in response to detection of said transition, for counting said flat articles subsequent to said transition, and, in response to a predetermined counting threshold being reached, for executing, for said subsequent flat articles and until the next transition detection, one of said first and second specialized unstacking programs that corresponds to the detected specialized article type.

2. An unstacker device according to claim 1, wherein said default nominal gap is larger than said second nominal gap and said second nominal gap is larger than said first nominal gap.

3. An unstacker device according to claim 1, further comprising at least one third specialized unstacking program suitable for maintaining a third nominal gap between two consecutive flat articles, and a fourth specialized unstacking program suitable for maintaining a fourth nominal gap between two flat articles.

4. An unstacker device according to claim 3, wherein said third nominal gap is larger than said second nominal gap and is smaller than said default nominal gap, and said fourth nominal gap is larger than said third nominal gap and smaller than said default nominal gap.

5. An unstacker device according to claim 1, wherein said first detection means are arranged to detect at least one of said first, second, third, and fourth specialized article types on the basis of at least one predetermined article type and corresponding respectively to letter-format flat articles, to large-format flat articles, to magazines, and to wrapped flat mailpieces.

6. An unstacker device according to claim 1, further comprising second detection means arranged to detect the difference between at least one predetermined physical characteristic of said unstacked flat article and the predetermined nominal value of said physical characteristic for the specialized article type to which said flat article corresponds, said monitoring/control unit being suitable for modulating said corresponding nominal gap in a predetermined manner as a function of said difference detection.

7. An unstacker device according to claim 1, wherein said control unit is suitable for modifying said predetermined gap or for modulating one of said nominal gaps by applying a predetermined value to at least one of the operating parameters of said unstacker device chosen from the group comprising at least the speed of movement of said flat article, the inclination of said flat article on edge, the position and the pressure of blowing applied to said flat article, and the magnitude of suction applied to said article.

8. An unstacker device according to claim 7, wherein said predetermined physical characteristic is chosen from the group comprising at least the dimensions, the stiffness, the thickness, and the weight of said unstacked flat article.

9. A method of unstacking flat articles comprising the steps of accepting flat articles disposed as a stack as input; unstacking the flat articles; delivering the flat articles as output in series and separated by a predetermined gap; detecting the transition between an article N of a first specialized article type or of a default article type and a consecutive article N+1 respectively of a second or of a first specialized article type; modifying the predetermined gap respectively depending on the article type that is detected so as to apply a corresponding first nominal gap or a corresponding second nominal gap; and after a transition has been detected, unstacking the flat articles with a default nominal gap that is different from said first and second nominal gaps, wherein, during an "increment counter" step, the flat articles subsequent to said transition are counted, and wherein, during a "counting threshold reached" step a check is made to determine whether said counting has reached a predetermined counting threshold, and, when said counting threshold is reached, and until the next transition detection step, the subsequent flat articles are unstacked with said first or second nominal gap corresponding to the detected article type.

10. An unstacking method according to claim 9, wherein, during a "difference detection" step, a check is made to detect the difference between at least one predetermined physical characteristic of said unstacked flat article and the predetermined nominal value of said physical characteristic for said corresponding specialized or default article type, and wherein, during a "modulate program" step, said corresponding nominal gap is modulated in a predetermined manner respectively in said specialized or in said default unstacking program as a function of said difference detection.

* * * * *